United States Patent
McDonald et al.

(10) Patent No.: US 6,445,647 B1
(45) Date of Patent: Sep. 3, 2002

(54) WIDEBAND-TO-NARROWBAND CONVERSION METHOD AND APPARATUS

(75) Inventors: Robert J. McDonald; Joellen Wilbur, both of Panama City Beach, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/382,717

(22) Filed: Aug. 24, 1999

(51) Int. Cl.$^7$ ................................................ G01S 3/801
(52) U.S. Cl. ........................................ 367/119; 367/103
(58) Field of Search ............................... 367/103, 119, 367/118, 124, 125, 129

(56) References Cited

U.S. PATENT DOCUMENTS

| | | | |
|---|---|---|---|
| 4,112,430 A | * 9/1978 | Ladstatter | 367/103 |
| 4,544,927 A | * 10/1985 | Kurth et al. | 343/373 |
| 5,436,872 A | * 7/1995 | Gilmour et al. | 367/103 |

OTHER PUBLICATIONS

Imai et al, "High Resolution BEamforming by Wigner–Ville Distribution Method", Proc. of the 1998 International Symposium on Underwater Technology, pp. 499–503, Apr. 1998.*

* cited by examiner

*Primary Examiner*—Ian J. Lobo
(74) *Attorney, Agent, or Firm*—Harvey A. Gilbert; Donald G. Peck

(57) ABSTRACT

A wideband-to-narrowband conversion method and apparatus performs the operational step of receiving an acoustic wideband signal, initially incident on an array of acoustic wideband transducers and subsequently digitized, and in response thereto generating a spatial Wigner bilinear kernel output signal, and the operational step of receiving and spatially bandpass filtering the spatial Wigner bilinear kernel output signal to remove a wideband low frequency portion as well as any unwanted noise therefrom and retain and output only a narrowband portion thereof.

8 Claims, 8 Drawing Sheets

WIDEBAND-TO-NARROWBAND CONVERSION METHOD AND APPARATUS

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

1. Field of the Invention

The present invention generally relates to a wideband sonar beamforming and, more particularly, is concerned with a wideband-to-narrowband conversion method and apparatus for use in wideband sonar beamforming.

2. Description of the Prior Art

Wideband linear frequency modulated (LFM) sonar signals (bandwidth greater than 10 to 15 percent of the carrier frequency) have application in active sonar. In addition to providing increased target strength, they provide application for more robust target classification methodologies. However, there are many advanced high resolution beamforming techniques which are based on phase-shift (not time-delay) beamforming and thus require a spatially narrowband signal across the array. Hence, the use of wideband LFM signals in active sonar is still an active area of research.

Although conceptually straightforward, time-delay beamforming of wideband LFM signals can be problematic, especially when time delays smaller than the time between samples are needed. Present approaches to wideband beamforming, such as exemplified by U.S. Pat. No. 4,544,927 to Kurth et al and U.S. Pat. No. 5,436,872 to Gilmour et al, use a combination of time-delay and phase-shift stages.

Recently, there has emerged an approach to wideband beamforming which converts the wideband signal to a narrowband signal via a spatial resampling filter. This approach is described in Krolik J., "Focused Wide-Band Array Processing for Spatial Spectral Estimation," *Advances in Spectrum Analysis and Array Processing*, vol. II, ed. Haykin S., Prentice Hall, Inc., NJ, pp. 221–261, 1991. However, the implementation of this methodology would be complex and may be difficult to realize in real time.

Consequently, there is a need for a methodology that is easy to implement in real time and allows phase-shift based beamforming to be used.

SUMMARY OF THE INVENTION

The present invention provides a wideband-to-narrowband conversion method and apparatus which is designed to satisfy the aforementioned need. The method and apparatus of the present invention is easy to implement in real time and converts a wideband LFM signal into a spatially narrowband sinusoid, thus allowing any phase-shift based beamforming processing to be used after the conversion process. The present invention applies to widebeam LFM signals and uses multipliers and a weighted bandpass fast Fourier transform (FFT) filter to generate, at a given snapshot or sample in time, the high frequency portion of a Wigner bilinear kernel, evaluated at the center of the array.

Accordingly, the present invention is directed to a wideband-to-narrowband conversion method which comprises the steps of: (a) receiving an acoustic wideband signal and, in response thereto, generating a spatial Wigner bilinear kernel output signal; and (b) receiving and spatially bandpass filtering the spatial Wigner bilinear kernel output signal to remove a wideband low frequency portion as well as any unwanted noise therefrom and retain and output only a narrowband portion thereof.

The present invention is also directed to a wideband-to-narrowband conversion apparatus which comprises: (a) a Wigner bilinear kernel generator means for receiving an acoustic wideband signal and, in response thereto, for generating a spatial Wigner bilinear kernel output signal; and (b) means for receiving and spatially bandpass filtering the spatial Wigner bilinear kernel output signal to remove a wideband low frequency portion as well as any unwanted noise therefrom and retain and output only a narrowband portion thereof.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
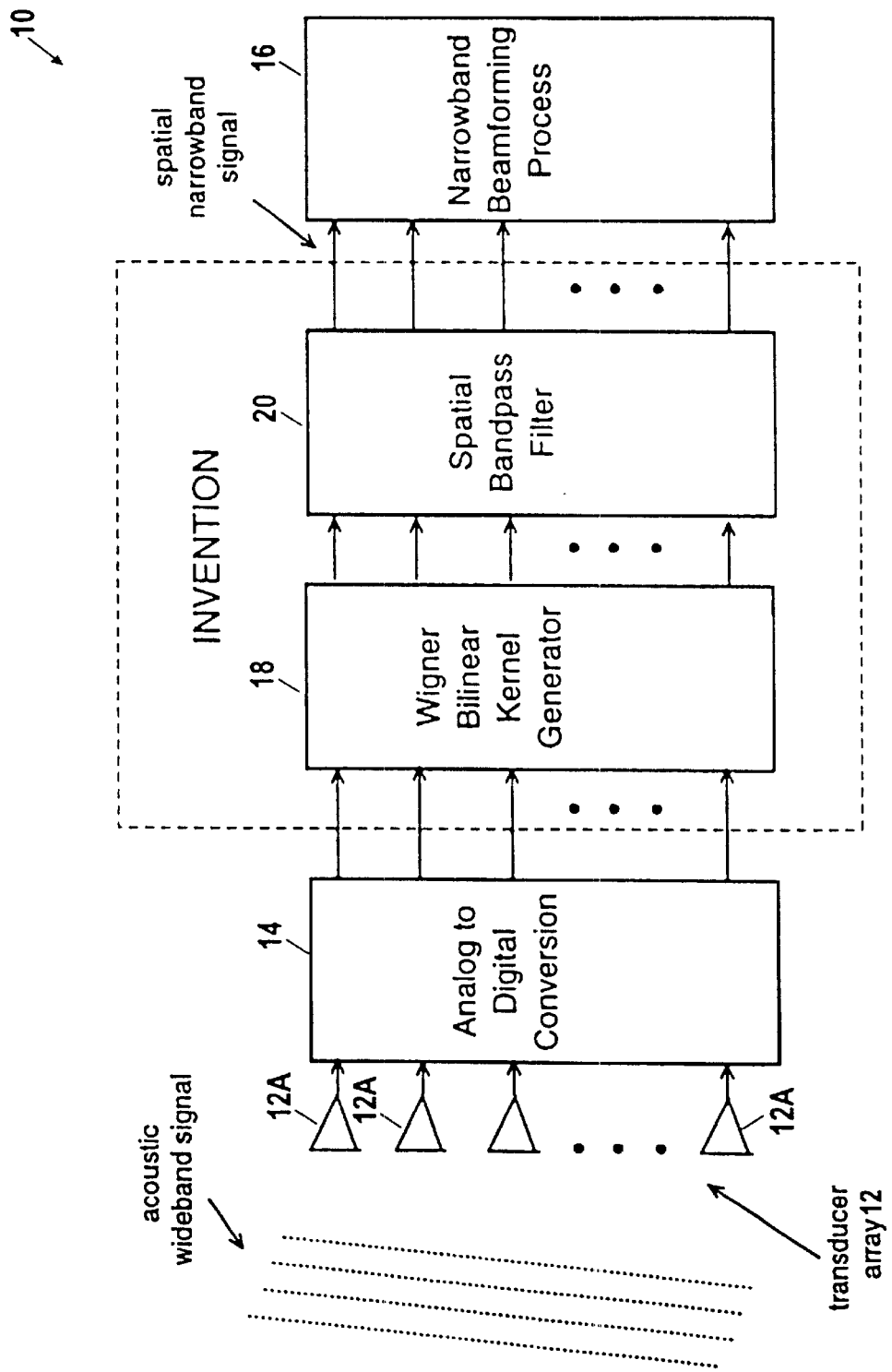
FIG. 1 is a conceptual block diagram of a wideband-to-narrowband conversion method and apparatus in accordance with the present invention.

Referring to the drawings and particularly to FIG. 1, there is illustrated a conceptual block diagram, generally designated 10, of a wideband-to-narrowband conversion method and apparatus for performing the method, in accordance with the present invention. The conversion method and apparatus are useful for such applications as wideband sonar beamforming. The conversion method and apparatus of the present invention converts an acoustic wideband LFM signal, incident upon an array 12 of linear acoustic transducers 12A and subsequently digitized by an analog-to-digital (A/D) conversion at block 14, into a spatial narrowband signal for feeding to a narrowband beamforming process at block 16 so that beamforming techniques which rely on a narrowband assumption, such as phase shift beamforming, may be used. The wideband-to-narrowband conversion apparatus for carrying out the method, as respresented by block diagram 10, basically includes means for generating or computing a spatial Wigner bilinear kernel output signal, evaluated with respect to the center of the array, as represented by block 18, and means for spatially bandpass filtering that kernel output signal, as represented by block 20, to remove a wideband low frequency portion as well as any unwanted noise from the kernel output signal and retain and output only the narrowband portion of the signal for the narrowband beamforming process of block 16.

Figure 2:
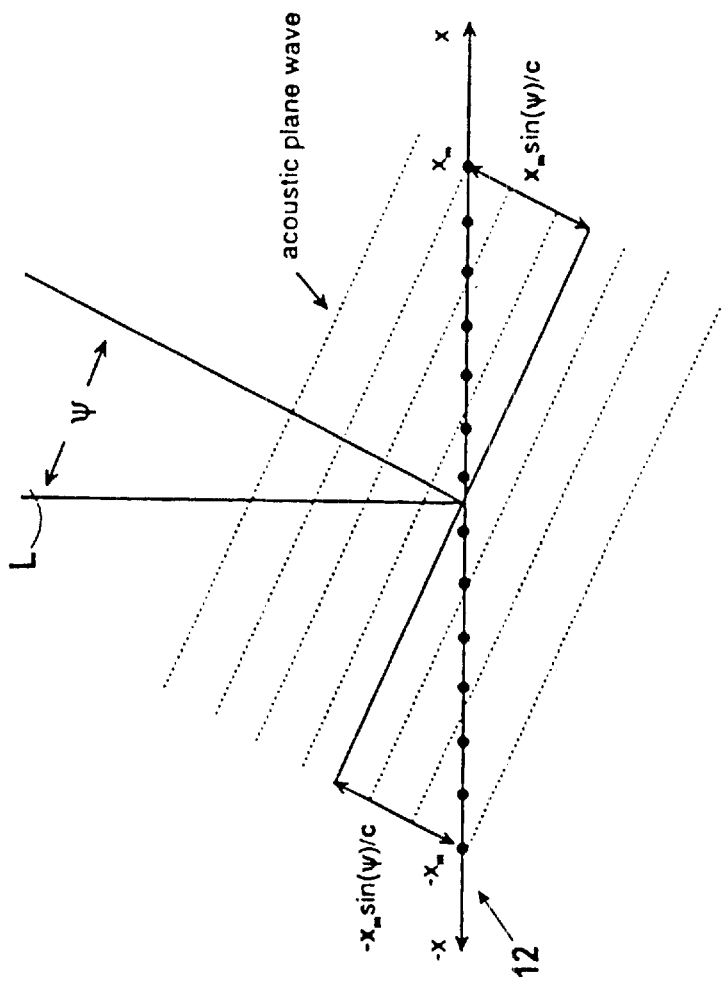
FIG. 2 is a diagram depicting the geometry for a wideband LFM plane wave incident, at an angle $\psi$, on a linear transducer array.

Referring now to FIG. 2, to aid the understanding of the details of operation of the conversion method of the present invention a review of the relevant geometry of a wideband acoustic signal impinging on the array 12 of transducers 12A will first be presented. In the geometry illustrated in FIG. 2, the number of transducers is 2m and the reference 0 (zero) is at the center of the array 12. Relative to the transducer at the center of the array 12, an $m^{th}$ transducer is located at a distance $x_m$ from the center of the array 12. The acoustic pulse is assumed to have a linear or planar wavefront which makes an angle $\psi$ with a line L normal to the array 12. Assume the length of the transmitted acoustic pulse is small relative to the minimum operating range of the sonar. Defining the transmitted pulse, p(t), to be of pulse duration $t_p$, then $t_p$ is much less than $t_i$, the time elapsed between pulse transmission and reception for the $i^{th}$ time sample or snapshot, as defined with respect to the center of the array 12. The corresponding waveform sample at the array center from a reflection along the angular direction $\psi$ is of the form $\tilde{p}$ ($t_i$ mod $t_p$) where the tilde represents waveform distortion from the medium, etc. and ($t_i$ mod $t_p$) is the remainder or fractional amount for the ratio of the total elapsed time to the pulse duration. For example, let $t_i$=(integer+fraction)*$t_p$, then ($t_i$ mod $t_p$)=fraction*$t_p$, where * stands for multiplication. At a sample time $t_i$ the $m^{th}$ transducer receives the signal delayed by a time proportional to the perpendicular distance between the transducer and the wave front, with the proportionality constant equal to the speed of sound, c, in the medium.

Assume that a time varying pulse of the follow form is transmitted:

$$p(t)=\sin(w_0 t+\alpha_t t^2) \text{ for } 0 \leq t \leq t_p \text{ and } p(t)=0 \text{ for } t>t_p \tag{1}$$

where t is time and $\alpha_t=(w_{hi}-w_0)/2t_p$ is defined to be the sweep rate (radians/sec$^2$) in terms of the final, $w_{hi}$ and initial, $w_0$ instantaneous frequencies. The received waveform, as seen across the array 12, at location x for the $i^{th}$ time sample is:

$$s_i(x) = a_i(x)\sin\left[w_0\left(\hat{t}_i + \frac{x\sin\psi}{c}\right) + \alpha_t\left(\hat{t}_i + \frac{x\sin\psi}{c}\right)^2\right] \tag{2}$$

where $\hat{t}_i=t_i$ modulo $t_p$, and $a_i(x)$ is a coefficient that depends on $\psi$, the reflectivity profile, the transmission channel and the receiver response pattern. Assuming the variations in $a_i(x)$ are small in x when taken over the array length, then $a_i(x)$ can be approximated as a constant factor for the given snapshot $t_i$. If new variables are defined, equation (2) can be expressed in a form which more clearly illustrates the spatial nature of the waveform across the array:

$$s_i(x)=a_i(x)\sin[\Omega_0(x+x_0)+\alpha_x(x+x_0)^2] \tag{3}$$

where, $$\Omega_0 = \frac{w_0 \sin\psi}{c} \text{ (radians/meter)}$$

$$x_0 = \frac{(t_i \text{ modulo } t_p)c}{\sin\psi} \text{ (meters)}$$

$$\alpha_x = \frac{\alpha_t \sin^2\psi}{c^2} \text{ (radians/meter}^2\text{)}$$

Equation (3) clearly shows that the transmitted LFM signal in equation (1) is received across the array 12 as a spatial LFM waveform with a sweep rate equal to $\alpha_x$. Note that if $\psi$ is zero, then, for a given snapshot or sample in time, the received waveform has a constant value across the array. The digitized form of equation (3) represents the spatial signal that is input to the Wigner bilinear kernel generator, shown in FIG. 1. Wigner bilinear kernel is per se known to those of ordinary skill in the art. It is described in Boashash, Boualem and Reilly, Andrew, "Algorithms for Time-Frequency Signal Analysis," *Time Frequency Signal Analysis Methods and Applications,* ed. Boualem Boashash, Wiley, N.Y., p.166, 1991.

Figure 3:
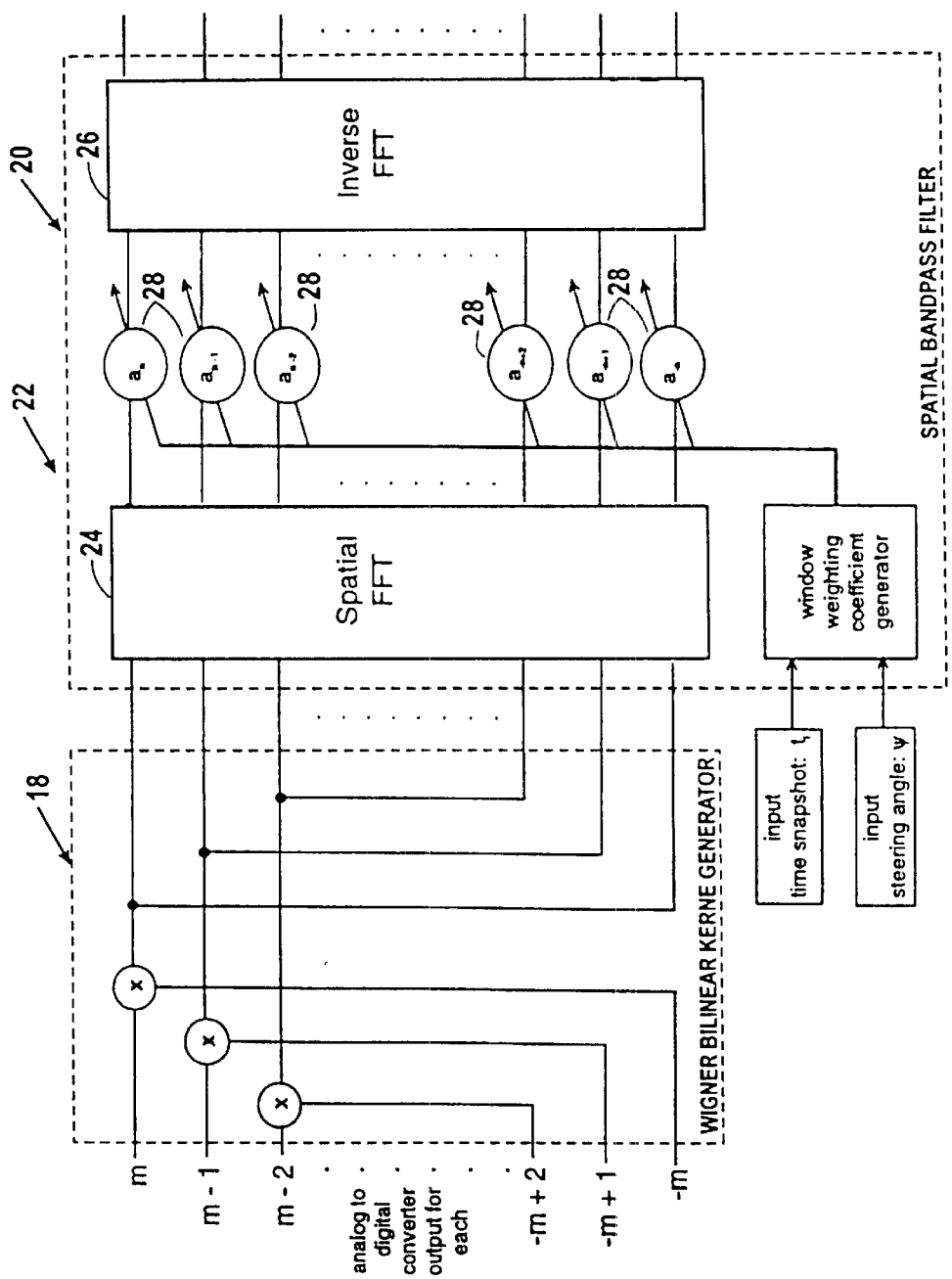
FIG. 3 is a functional block diagram of the preferred embodiment of the conversion method and apparatus of the present invention.

Referring to FIG. 3, there is illustrated a detailed functional block diagram, generally designated 22, of the preferred embodiment of the conversion method and apparatus of the present invention. Since generating the Wigner bilinear kernel, evaluated at the center of the transducer array 12, on the output of the 2m transducers yields a symmetric spatial function, the number of multipliers needed is m. As shown in FIG. 3, the Wigner bilinear kernel generator of block 18 produces the kernel output for transducer m and −m by taking the digitized output of transducer m multiplied by the output of transducer −m; the kernel output for transducer (m−1) and transducer (−m+1) by multiplying transducer outputs at (m−1) and (−m+1), and so on.

The 2m outputs from Wigner bilinear kernel generator of block 18 are sent to the spatial bandpass filter of block 20. Before discussing the details of the filter, it is instructive to look at the output of the bilinear kernel, at snapshot $t_i$, $$s_i(x)s_i(-x) = \tag{4}$$
$$\frac{1}{2}\{\cos[2\Omega_0 + 4\alpha_x x_0)x] - \cos[2x_0\Omega_0 + \alpha_x x_0^2 + \alpha_x x^2]\}$$

where $w_0$, $\alpha_x$ and $x_0$ have been defined previously and, without loss of generality, the coefficient $a_i(x)$ has been set equal to 1. The Wigner bilinear kernel in equation (4), evaluated at the center of the array 12, consists of two terms: a single high spatial frequency at $2\Omega_0+4\alpha_x x_0$ (first term), and a lower broadband frequency component, which varies spatially (second term). If the lower broadband frequency component is spatially filtered out, then the resulting output is a narrowband signal, which would be suitable for phase shift beamforming.

One way of keeping only the high frequency narrowband component in equation (4) is to apply a tight bandpass filter with a center frequency of $2\Omega_0+4\alpha_x x_0$ to the kernel for each snapshot, $t_i$. In the preferred embodiment of the present invention shown in FIG. 3, the bandpass filter of block 20 has been implemented by windowing the output of a spatial FFT filter of block 24 on the bilinear kernel and then performing an inverse FFT filter at block 26. The output of the spatial FFT filter of block 24 on the symmetric Wigner bilinear kernel is by definition the discrete spatial Wigner distribution evaluated at the array center. The Wigner distribution output is then windowed in such a manner as to retain the narrowband high frequency portion and remove the broadband low frequency portion. The inverse FFT filter of block 26 is then applied to the output of the windowed Wigner distribution. Although other filters could be used, the windowed FFT/(inverse FFT) filter approach is preferred because it is fast, and easily vectorized for real time implementation, since all the 2m outputs from the bilinear kernel generator of block 18 are processed in parallel.

Zero pad din g the spatial samples is implicit in the FFT when the number of array transducers is not a power of two. Zero padding is performed symmetrically such that the kernel input to a length 2n FFT has zeros placed from −n to −m and m to n. The spatial window generator, shown in FIG. 3, generates, for each snapshot in time, a set of window weights, $a_0$, represented by circles 26 which are centered around both the positive and negative FFT output bins associated with the spatial frequency $2\Omega_0+4\alpha_x x_0$.

The choice of window type is arbitrary, usually based on an apriori knowledge of the noise statistics and transmitted signal type. After the output from the spatial FFT filter of block 24 has been multiplied by the window weights at circles 28, the inverse FFT filter of block 26 is taken and the center 2m points are retained. This completes the filtering operation. The wideband spatial signal has now been converted to a spatially narrowband signal, ready for narrowband beamforming. Using simulated noiseless data, with realistic transmit signal parameter values, the present invention will now be demonstrated.

Figure 4A:
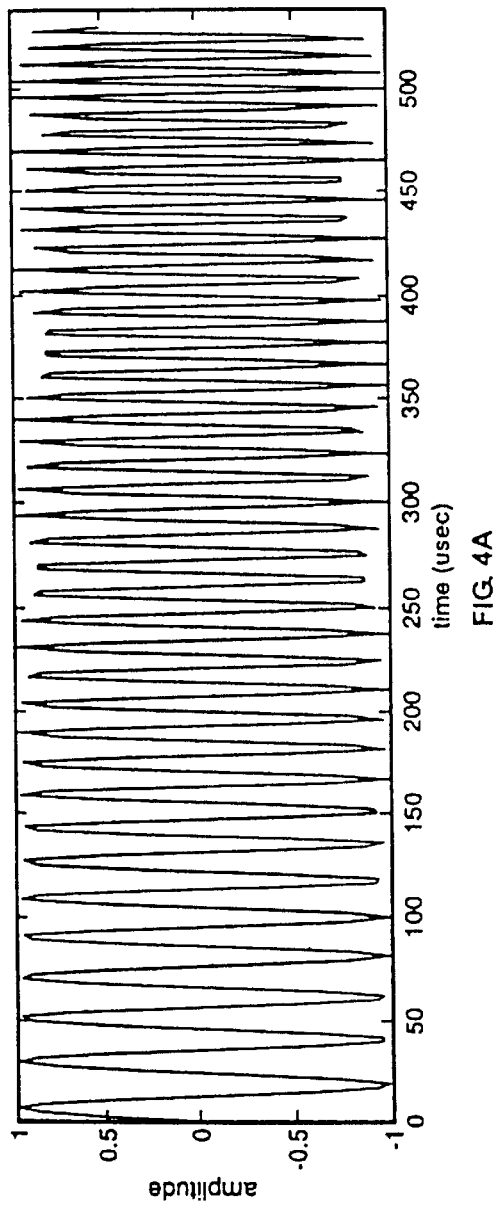
FIG. 4A is a graph showing the transmitted acoustic wideband LFM pulse.
Figure 4B:
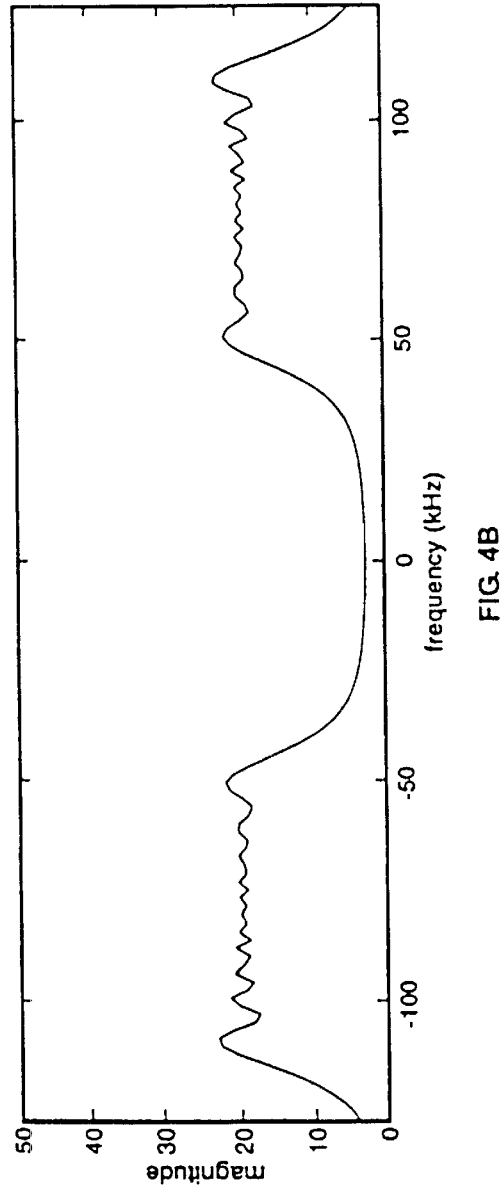
FIG. 4B is a graph showing the spectrum corresponding to the pulse of FIG. 4A.
Figure 5A:
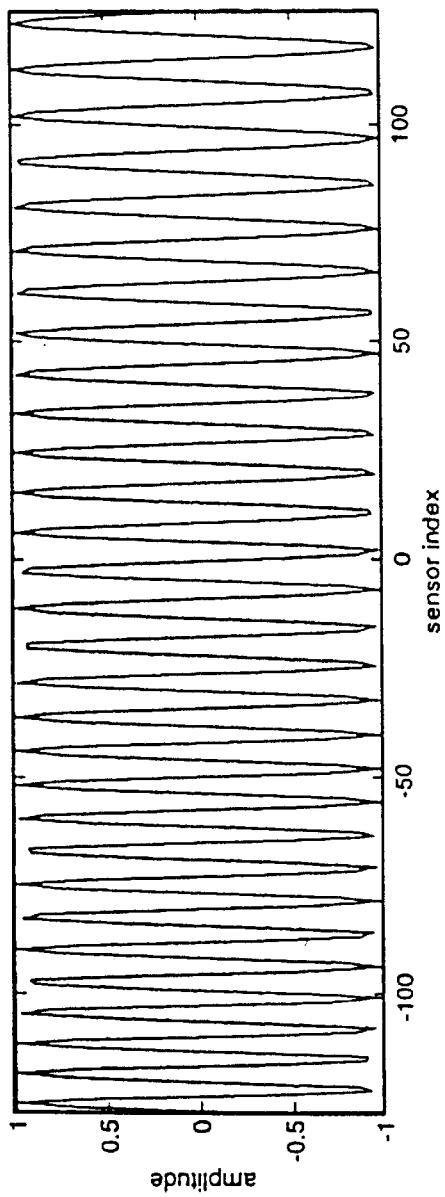
FIG. 5A is a graph showing the received wideband LFM signal as seen by the array at a time snapshot or sample $t_i$.
Figure 5B:
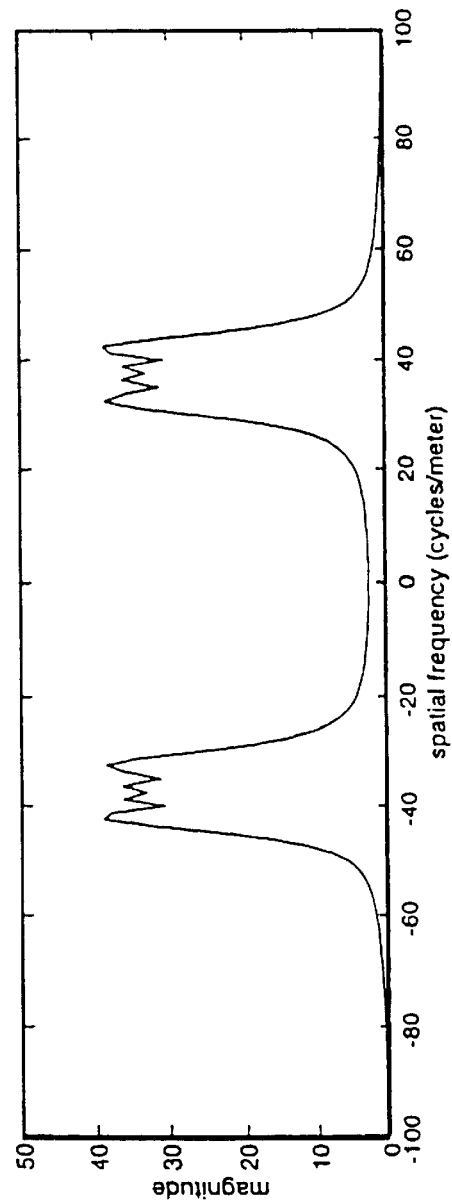
FIG. 5B is a graph showing the spectrum corresponding to the signal of FIG. 5A.

For illustrative clarity, it will be assumed that the linear array 12 consists of 256 acoustic transducers. The transmitted analog LFM pulse is shown in FIG. 4A while its spectrum, which is clearly wideband, is shown in FIG. 4B. The LFM pulse has the following parameters:

$w_0 = 2*pi*(4\times10^4)$ radians/sec
$w_{hi} = 2*pi*(1.2\times10^5)$ radians/sec
$t_p = 5.3333\times10^{-4}$ sec
$\alpha_t = (w_{hi}-w_0)/2t_p = 4.7124\times10^8$ radians/(sec)$^2$ The pulse is transmitted at time t equal to 0. FIG. 5A shows the received spatial signal as it would appear across the 256 transducer array 12 at time snapshot $t_i$ equal to $54.247\times10^{-3}$ sec, with an angle of incidence, $\Omega$, equal to 35 degrees. The wideband LFM nature of the signal is clearly illustrated in its spectrum, shown in FIG. 5B.

Figure 6A:
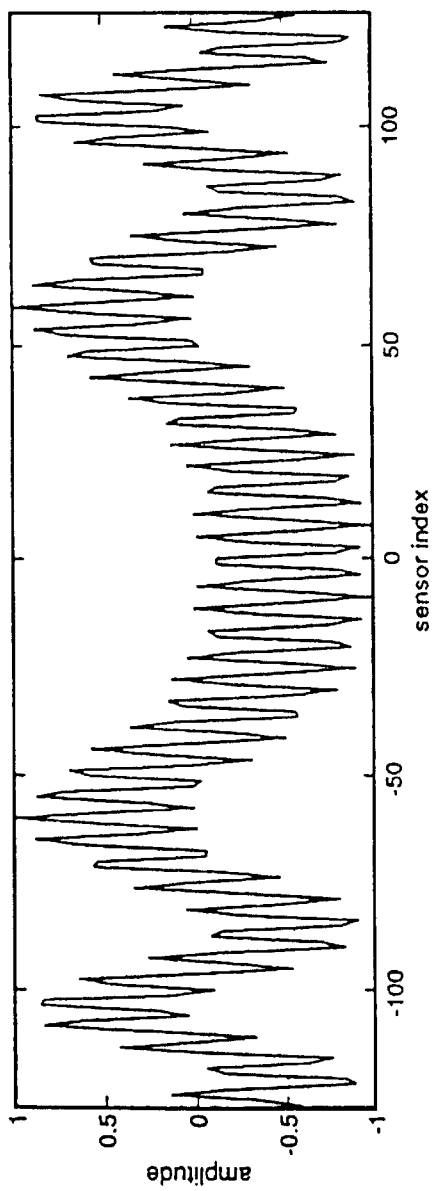
FIG. 6A is a graph showing the output signal of the Wigner bilinear kernel generator.
Figure 6B:
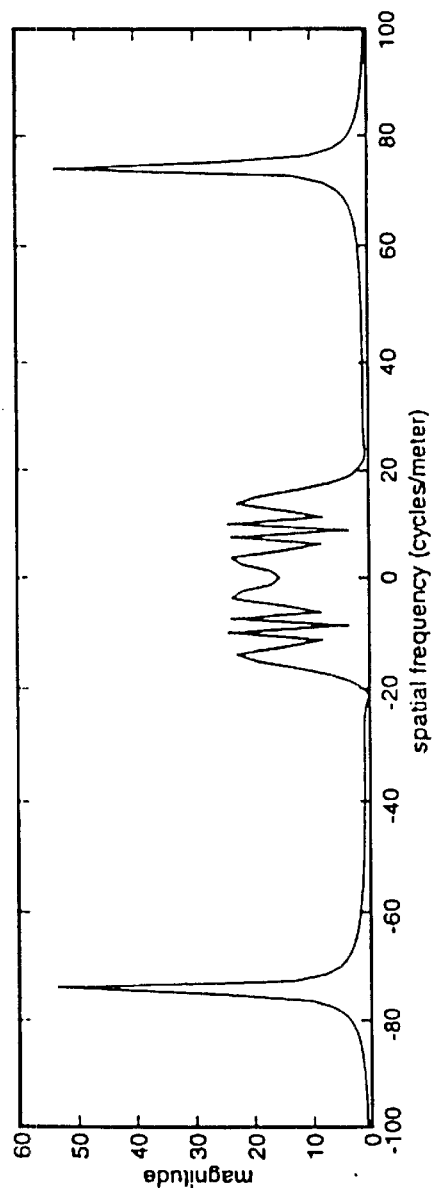
FIG. 6B is a graph showing the spectrum corresponding to the output signal of FIG. 6A.

The graphs in FIGS. 6A and 6B respectively show the output from the Wigner bilinear kernel generator of block 18 and its spectrum magnitude. The wideband and narrowband components of the kernel spectrum are clearly evident. It is desired to keep only the narrowband portion of the kernel output, hence first the wideband portion must be filtered out.

Figure 7:
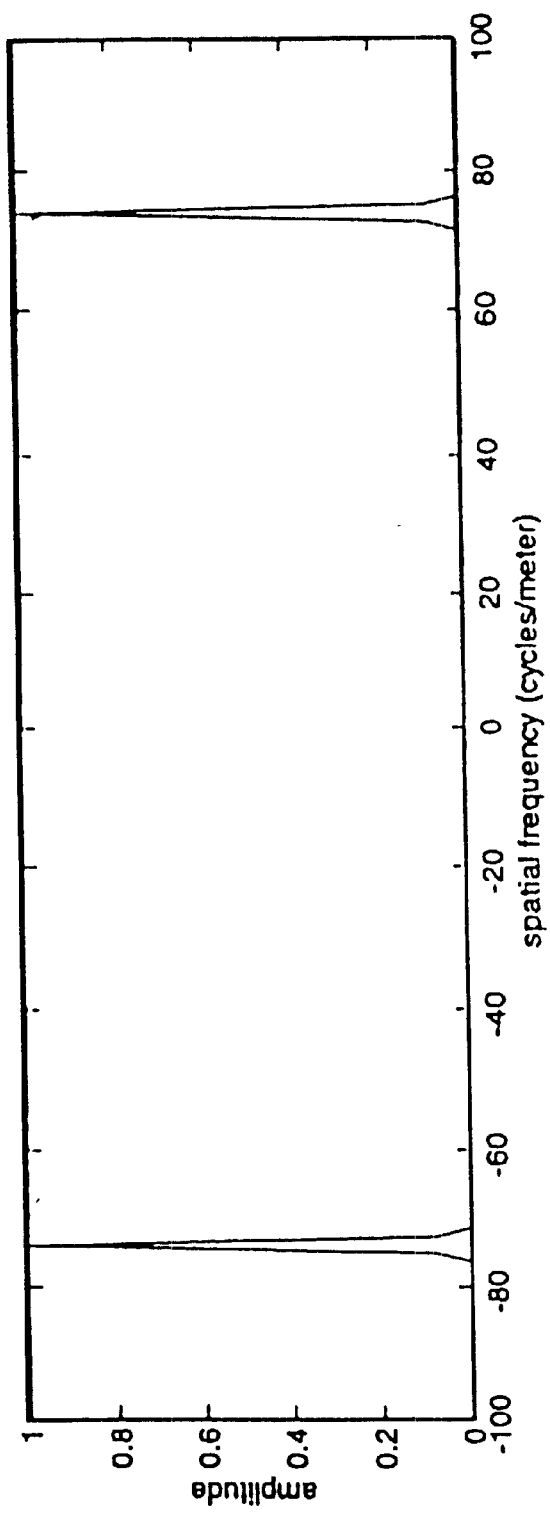
FIG. 7 is a graph showing the output signal of the window generator for the time snapshot $t_i$.
Figure 8A:
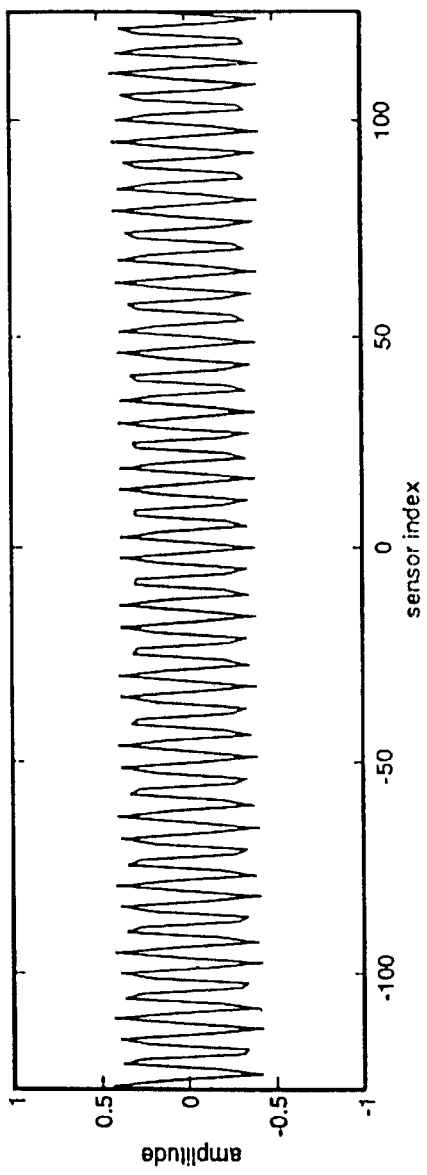
FIG. 8A is a graph showing the narrowband output signal of the conversion method and apparatus for the time snapshot $t_i$.
Figure 8B:
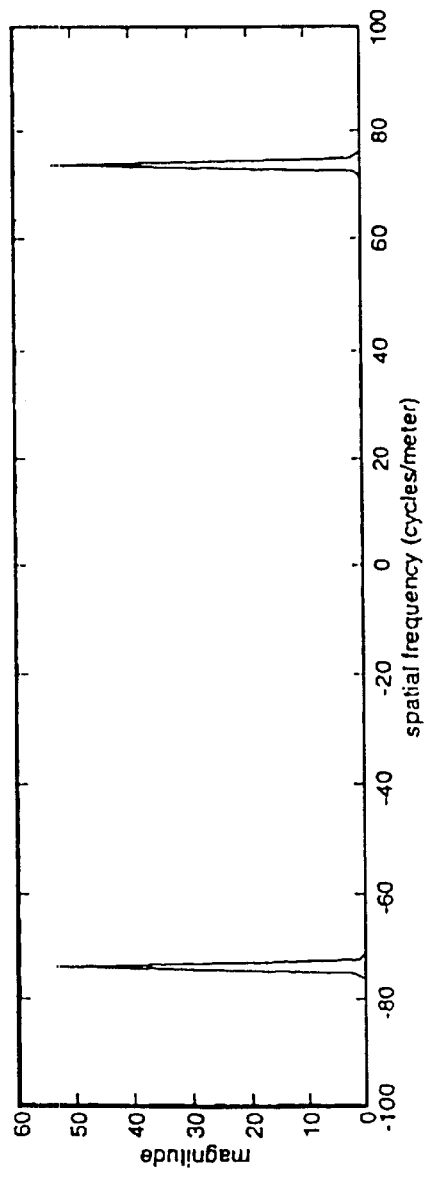
FIG. 8B is a graph showing the spectrum corresponding to the output signal of FIG. 8A.

Given the angle of incidence $\Omega$, and the time snapshot $t_i$, the window generator calculates the center spatial frequency of the high frequency narrowband component of the kernel, which for this particular example is: $(2\Omega_0+4\alpha_x x_0)/2\pi=74.2$ cycles/meter. It then generates a set of window weights about that spatial frequency, as shown in FIG. 7. Because the Wigner bilinear kernel is real and symmetric, the Fourier transform properties of reflection and conjugation lead to a real symmetric output for the corresponding kernel spectrum. In FIG. 8A is shown the output of the present invention, which results from multiplying the window shown in FIG. 7 by the real part of the FFT of the Wigner bilinear kernel and then performing the inverse FFT filter operation. The narrowband nature of the output of the present invention is clearly evident in its spectrum magnitude, as seen in FIG. 8B. At this point conventional phase shift beamforming and/or narrowband high resolution array processing algorithms may be applied.

Note should be taken that the output of the conversion method and apparatus shown in FIG. 8A has an amplitude of ½ that of the input waveform. The factor of ½ arises from equation (4). In the presence of noise, the factor of ½ would also apply to the noise terms that fall within the passband of the spatial narrowband filtering (block 20). The Wigner bilinear kernel generating (block 18) of signal plus noise is, by itself, a noisy operation; however, the random phase effects on the noise will prevent the noise related contributions from collapsing down to pass within the spatial narrowband filtering (block 20).

To broadly summarize, the Wigner bilinear kernel generator of block 18 and spatial bandpass filter of block 20 are implemented by forming the spatial Wigner distribution, evaluated at the array center, and inverse transforming the windowed Wigner distribution. More particularly, assuming the following information is given: the speed of sound in the medium, c, the number of transducers in the array, 2m, the LFM pulse length, $t_p$, the initial frequency, $w_0$ and the sweep rate, $\alpha_t$, and the steering angle, $\Omega$, the steps of the conversion method of the present invention are as follows: (1) from the digitized output of a linear transducer array at time samples, $t_i$, generate the spatial Wigner bilinear kernel around the array center; (2) symmetrically zero pad the output from step (1) to the nearest power of two and take the spatial FFT; (3) using the given information, compute the following quantities:

$$\Omega_0 = \frac{w_0 \sin\psi}{c} \text{(radians/meter)}$$

$$x_0 = \frac{(t_i \text{ modulo} t_p)c}{\sin\psi} \text{(meters)}$$

$$\alpha_x = \frac{\alpha_t \sin^2\psi}{c^2} \text{(radians/meter}^2)$$

(4) using the quantities generated in step (3) compute a set of 2n window coefficients, $(a_{-n}, a_n)$ centered to peak around the frequency: $2\Omega_0+4\alpha_x x_0$; (5) multiply the output of step (4) by the real part of the output of step (2); and (6) inverse FFT filter the output of step (5) and retain the appropriate 2m samples.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. A wideband-to-narrowband conversion method, comprising the steps of:
   (a) receiving an acoustic wideband signal and, in response thereto, generating a spatial Wigner bilinear kernel output signal, said acoustic wideband signal being initially incident upon an array of linear acoustic transducers and outputted as an analog acoustic wideband signal by the array of linear acoustic transducers that is digitized before said generating of said spatial Wigner bilinear kernel output signal therefrom, said generating of the Wigner bilinear kernel output signal producing spatial Wigner bilinear kernel outputs for paired transducers of said transducer array symmetrically positioned relative to and in opposite directions from a center of said transducer array by multiplying the digitized outputs of said paired transducers with one another; and (b) receiving and spatially bandpass filtering said spatial Wigner bilinear kernel outputs to remove a wideband low frequency portion as well as any unwanted noise therefrom and retain and output only a narrowband portion thereof.

2. The conversion method of claim 1 wherein said digitized acoustic wideband signal is evaluated at a center of the array of linear acoustic transducers.

3. The conversion method of claim 1 wherein said spatial bandpass filtering includes receiving and spatial fast Fourier transform (FFT) filtering said multiplied digitized outputs of said paired transducers to provide weighted FFT outputs that have been multiplied by window weights.

4. The conversion method of claim 3 wherein said spatial bandpass filtering further includes receiving and inverse FFT filtering said weighted FFT outputs to provide the narrowband portion of the signal.

5. A wideband-to-narrowband conversion apparatus, comprising:

(a) an array of linear acoustic transducers for receiving an acoustic wideband signal and outputting a sensed analog acoustic wideband signal;

(b) an analog-to-digital convertor for receiving said sensed analog acoustic wideband signal and outputting a digitized acoustic wideband signal;

(c) a Wigner bilinear kernel generator means for receiving said digitized acoustic wideband signal and, in response thereto, for generating spatial Wigner bilinear kernel outputs for paired transducers of said transducer array symmetrically positioned relative to and in opposite directions from a center of said transducer array by multiplying the digitized outputs of said paired transducers with one another; and (d) means for receiving and spatially bandpass filtering said spatial Wigner bilinear kernel outputs to remove a wideband low frequency portion as well as any unwanted noise therefrom and retain and output only a narrowband portion thereof.

6. The conversion apparatus of claim 5 wherein said digitized acoustic wideband signal is evaluated at a center of said array of linear acoustic transducers.

7. The conversion apparatus of claim 5 wherein said spatial bandpass filtering means includes spatial fast Fourier transform (FFT) filtering means for receiving and spatial FFT filtering said multiplied digitized outputs of said paired transducers to provide weighted FFT outputs that have been multiplied by window weights.

8. The conversion apparatus of claim 7 wherein said spatial bandpass filtering means further includes inverse FFT filtering means for receiving and inverse FFT said weighted FFT outputs to provide the narrowband portion of the signal.

* * * * *